(12) United States Patent
Iwamatsu et al.

(10) Patent No.: US 10,630,178 B2
(45) Date of Patent: Apr. 21, 2020

(54) POWER CONVERTER (71) Applicant: Panasonic Intellectual Property Management Co., Ltd., Osaka (JP)

(72) Inventors: Yusuke Iwamatsu, Osaka (JP); Naoaki Fujii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/266,210

(22) Filed: Feb. 4, 2019

(65) Prior Publication Data
US 2019/0173379 A1 Jun. 6, 2019

Related U.S. Application Data (63) Continuation of application No. PCT/JP2017/026342, filed on Jul. 20, 2017.

(30) Foreign Application Priority Data

Sep. 30, 2016 (JP) ................................. 2016-193291

(51) Int. Cl.
*H02M 7/44* (2006.01)
*H02M 3/156* (2006.01)
(Continued)

(52) U.S. Cl.
CPC .............. *H02M 3/156* (2013.01); *G05F 1/67* (2013.01); *H02J 3/385* (2013.01); *H02M 7/44* (2013.01);
(Continued)

(58) Field of Classification Search
CPC ........ H02M 1/12; H02M 1/42; H02M 1/4225; H02M 1/4233; H02M 1/4241;
(Continued)

(56) References Cited

U.S. PATENT DOCUMENTS 8,184,460 B2 5/2012 O'Brien et al.
2011/0085361 A1* 4/2011 Sakakibara ......... H02M 7/2173
363/126
(Continued)

FOREIGN PATENT DOCUMENTS

JP 2013-090364 5/2013
JP 2013-090364 A 5/2013

OTHER PUBLICATIONS

Search Report issued by the European Patent Office for corresponding European patent application No. 17855382.2 dated Oct. 2, 2019.

*Primary Examiner* — Bryan R Perez
(74) *Attorney, Agent, or Firm* — Renner, Otto, Boisselle & Sklar, LLP (57) ABSTRACT

A first controller controls the DC-DC converter to perform a step-up operation when a voltage on the DC bus is lower than a first reference voltage and controls the DC-DC converter to suspend the step-up operation when the voltage is equal to or higher than the first reference voltage. A second controller controls the inverter to maintain the voltage on the DC bus constant when the voltage on the DC bus is lower than a second reference voltage and controls the inverter to maximize an output power of the inverter when the voltage is equal to or higher than the second reference voltage.

10 Claims, 7 Drawing Sheets

(51) Int. Cl.
  *H02J 3/38* (2006.01)
  *H02M 7/5387* (2007.01)
  *G05F 1/67* (2006.01)
  *H02M 1/00* (2006.01)
(52) U.S. Cl.
  CPC .......... *H02M 7/53871* (2013.01); *H02M 2001/0003* (2013.01); *H02M 2001/007* (2013.01)
(58) Field of Classification Search
  CPC .. H02M 1/4258; H02M 1/425; H02M 1/4208; H02M 7/42; H02M 7/48; H02M 7/487; H02M 7/501; H02M 7/4826; H02M 7/497; H02M 7/49; H02M 7/4807; H02M 7/537; H02M 7/5387; H02M 7/53; H02M 7/533; H02M 5/40; H02M 5/42; H02M 5/44; H02M 5/443; H02M 5/45; H02M 5/4505; H02M 5/451; H02M 5/452; H02M 5/458; H02M 5/4585
  See application file for complete search history.

(56) References Cited

U.S. PATENT DOCUMENTS

| | | |
|---|---|---|
| 2014/0211530 A1 | 7/2014 | Chen et al. |
| 2015/0270787 A1* | 9/2015 | Fujisaki .......... H02M 1/08 363/41 |
| 2016/0043628 A1* | 2/2016 | Chiang .......... H02M 3/156 363/53 |

* cited by examiner

POWER CONVERTER

CROSS-REFERENCE TO RELATED APPLICATIONS

This application is a U.S. Continuation application of PCT International Application Number PCT/JP2017/026342, filed on Jul. 20, 2017, claiming the benefit of priority of Japanese Application Number 2016-193291, filed on Sep. 30, 2016, the entire contents of which are hereby incorporated by reference.

BACKGROUND

1. Field of the Invention

The present disclosure relates to a power conversion system and a power converter for converting a DC power generated by a solar cell into an AC power.

2. Description of the Related Art

In the related art, maximum power point tracking (MPPT) control is often used to control a solar cell to acquire generated power maximally. MPPT control allows the operating voltage (output voltage) of a solar cell to vary in predetermined step sizes to search for the maximum power point of the solar cell. MPPT control is usually executed by a step-up converter provided between the solar cell and the inverter. The generated power at the maximum power point is output to the inverter via a DC bus. The inverter converts the generated power (DC power) input via the DC bus into an AC power and outputs the AC power to the commercial power system (hereinafter, simply referred to as the system).

The inverter controls the voltage on the DC bus to be higher than the voltage of the system and outputs the power to the system. In this process, the closer the voltage on the DC bus to the voltage of the system, the smaller the power conversion loss.

Meanwhile, the DC bus is connected to the output of the step-up converter, and the input voltage of the solar cell cannot be equal to or higher than the bus voltage. In other words, the operating voltage point of the solar cell is limited to be equal to or lower than the bus voltage. This means that the operating point of the solar cell cannot be controlled to an optimal value when the optimal operating point of the solar cell is in a zone equal to or higher than the bus voltage.

One conceivable approach is to control the optimal operating point of the solar cell such that the bus voltage is maintained at a voltage that cannot be where the optimal operating point is found. For example, the operating point may be maintained at the maximum voltage value (e.g., 400 V) of the solar cell panel, but that would worsen the power conversion loss in the inverter.

There is also proposed a method of reducing power conversion loss by controlling the bus voltage arbitrary while MPPT control is being executed to meet a condition requiring that the bus voltage is equal to or larger than the system voltage (refer to Japanese Unexamined Patent Application Publication No. 2013-90364, for example).

In the method proposed above, a determination is made as to whether the bus voltage meets a reference value (i.e., whether the bus voltage is equal to or higher than the system voltage) based on the input voltage of the solar cell. However, because there are semiconductor devices such as reactors and diodes between the input of the solar cell and the DC bus, a voltage drop occurs due to those semiconductor devices and an error is created between the input voltage of the solar cell and the bus voltage.

To compensate the error, it is necessary to increase the reference value by a margin corresponding to the error, which increases the bus voltage and reduces the loss reduction effect. Since the operation of the step-up converter and the inverter is determined based on the result of comparing the input voltage of the solar cell with the reference value, it is necessary to send the input voltage of the solar cell from the step-up converter to the inverter by way of communication if the step-up converter and the inverter are separately controlled.

SUMMARY

The present disclosure addresses the issue discussed above and a purpose thereof is to provide a power conversion system and a power converter capable of reducing the conversion loss in the inverter, while also maximizing the electricity generated by the solar cell.

A power conversion system according to one aspect of the embodiment includes: a DC-DC converter that converts a DC power supplied from a solar cell into a DC power of a different voltage and outputs the DC power to a DC bus; an inverter that converts the DC power input from the DC bus into an AC power and outputs the AC power to a system; a first controller that controls the DC-DC converter to perform a step-up operation when a voltage on the DC bus is lower than a first reference voltage and controls the DC-DC converter to suspend the step-up operation when the voltage is equal to or higher than the first reference voltage; and a second controller that controls the inverter to maintain the voltage on the DC bus constant when the voltage on the DC bus is lower than a second reference voltage and controls the inverter to maximize an output power of the inverter when the voltage is equal to or higher than the second reference voltage.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1:
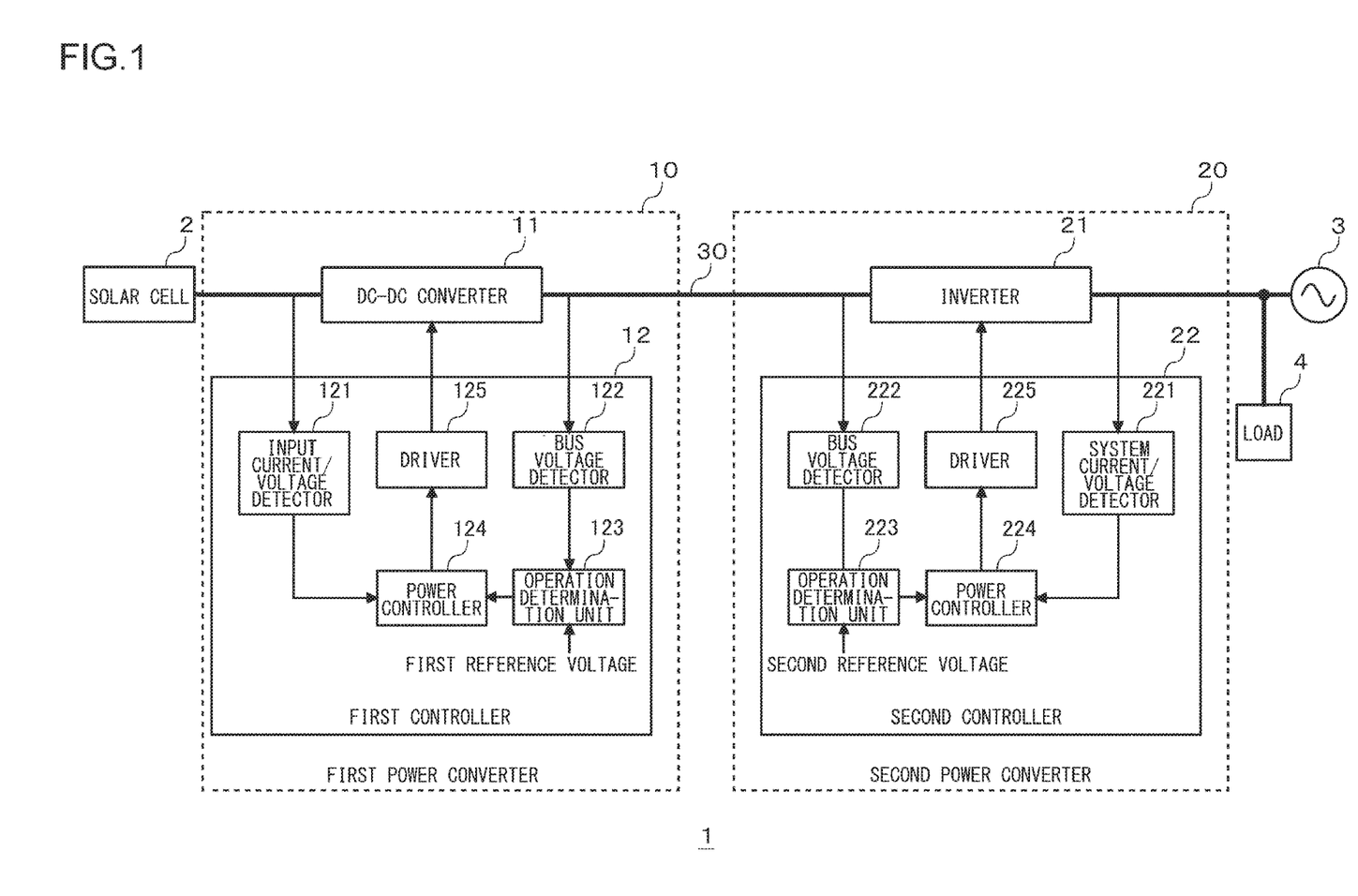
FIG. 1 shows a power conversion system according to one aspect of the disclosure.

FIG. 1 shows a power conversion system 1 according to one aspect of the disclosure. In this embodiment, an example in which a DC-DC converter for converting power generated by a solar cell 2 into power of a different voltage and an inverter for converting the DC power having the converted voltage into an AC power are installed in separate housings. By installing the DC-DC converter and the inverter in different housings, the size of the individual housings can be reduced and the flexibility in the installation is improved. For example, it is possible to install the DC-DC converter and the inverter at positions distanced from each other. It is also possible to install a solar cell or a storage battery additionally.

The power conversion system 1 includes a first power converter 10 and a second power converter 20, which are connected by a DC bus 30. The first power converter 10 includes a DC-DC converter 11 and a first controller 12, and the second power converter 20 includes an inverter 21 and a second controller 22.

The DC-DC converter 11 converts a DC power supplied from the solar cell 2 into a DC power of a different voltage and outputs the DC power to the DC bus 30. For example, the DC-DC converter 11 may be formed by a step-up chopper. The simplest step-up chopper is comprised of a series circuit including a reactor and a diode and of a switching device connected between the ground and the node of connection between the reactor and the diode. For example, an Insulated Gate Bipolar Transistor (IGBT) or a Metal-Oxide-Semiconductor Field Transistor (MOSFET) can be used as the switching device.

The first controller 12 includes an input current/voltage detector 121, a first bus voltage detector 122, a first operation determination unit 123, a first power controller 124, and a first driver 125. The configuration of the first controller 12 can be realized by cooperation of hardware resources and software resources or only by hardware resources. An analog device, microcomputer, DSP, ROM, RAM, FPGA, and other LSIs can be used as hardware resources. Programs such as firmware can be used as software resources.

The input current/voltage detector 121 detects the input current and the input voltage of the DC-DC converter 11, which are the output current and the output voltage of the solar cell 2. The first bus voltage detector 122 detects the voltage on the DC bus 30.

The first operation determination unit 123 compares the DC bus voltage detected by the first bus voltage detector 122 with the first reference voltage. When the DC bus voltage is lower than (or equal to lower than) the first reference voltage, the first operation determination unit 123 directs the first power controller 124 to cause the DC-DC converter 11 to operate in the MPPT control mode. When the DC bus voltage is equal to or higher than (or higher than) the first reference voltage, the first operation determination unit 123 directs the first power controller 124 to cause the DC-DC converter 11 to operate in the step-up suspension mode.

In the MPPT control mode of operation, the first power controller 124 controls the input power of the solar cell 2, which is measured based on the input current and the input voltage detected by the input current/voltage detector 121, to be at the maximum power point (optimal operating point). More specifically, the first power controller 124 causes the operating point voltage to vary in predetermined step sizes according to the hill climbing method to search for the maximum power point and controls the input power of the solar cell 2 to be maintained at the maximum power point. The first power controller 124 generates a voltage command value based on a difference between the operating point voltage and the DC bus voltage detected by the first bus voltage detector 122 and outputs the voltage command value to the first driver 125.

The first driver 125 generates a drive signal based on the voltage command value and drives the switching device of the DC-DC converter 11 accordingly. For example, the first driver 125 includes a comparator for comparing the voltage command value with a carrier wave (triangular wave). The comparator outputs a PWM signal commensurate with a result of comparison between the voltage command value and the carrier wave to the gate terminal of the switching device as a drive signal.

In the step-up suspension mode of operation, the first power controller 124 generates a command for controlling switching device of the DC-DC converter 11 to be turned off and outputs the command to the first driver 125. The first driver 125 generates a drive signal for controlling the switching device of the DC-DC converter 11 to be turned off based on the command and outputs the drive signal to the gate terminal of the switching device.

The inverter 21 converts the DC power input from the DC bus 30 into an AC power and outputs the AC power to the system 3. For example, the inverter 21 includes a bridge circuit in which four switching devices are connected in a bridge. The output of the inverter 21 can be regulated by controlling the duty of the switching devices.

The second controller 22 includes a system current/voltage detector 221, a second bus voltage detector 222, a second operation determination unit 223, a second power controller 224, and a second driver 225. The feature of the second controller 22 is implemented by the coordination of hardware resources and software resources, or hardware resources alone. An analog device, microcomputer, DSP, ROM, RAM, FPGA, and other LSIs can be used as hardware resources. Programs such as firmware can be used as software resources.

The system current/voltage detector 221 detects the current and voltage on the power distribution line connecting the second power converter 20 and the system 3. A load 4 is connected to the power distribution line and the current that flows in the power distribution line varies depending on how the load 4 is being used. The voltage on the power distribution line is determined by the voltage of the system 3 unless a power failure occurs. The second bus voltage detector 222 detects the voltage on the DC bus 30.

The second operation determination unit 223 compares the DC bus voltage detected by the second bus voltage detector 222 with the second reference voltage. When the DC bus voltage is lower than (or equal to lower than) the second reference voltage, the second operation determination unit 223 directs the second power controller 224 to cause the inverter 21 to operate in the constant voltage control mode. When the DC bus voltage is equal to or higher than (or higher than) the second reference voltage, the second operation determination unit 223 directs the second power controller 224 to cause the inverter 21 to operate in the MPPT control mode.

In the constant voltage control mode of operation, the second power controller 224 generates a voltage command value based on a difference between a predefined target value of the DC bus voltage and the bus voltage detected by the second bus voltage detector 222. The target value is set to indicate a voltage higher than the system voltage (e.g., AC 200V) and as close as possible to the system voltage. For example, the target value is set to indicate DC 330V. The smaller the difference between the voltage on the DC bus 30 and the system voltage, the smaller the conversion loss in the inverter 21 (more specifically, in the switching devices) and the higher the power conversion efficiency.

The second power controller 224 generates a voltage command value based on a difference between the target value of the bus voltage and the bus voltage actually detected. The second power controller 224 generates an ultimate voltage command value based on a difference between the voltage command value and the voltage on the power distribution line detected by the system current/voltage detector 221 and outputs the ultimate voltage command value to the second driver 225. The second driver 225 generates a drive signal based on the voltage command value and drives the switching devices of the inverter 21 accordingly.

In the MPPT control mode of operation, the second power controller 224 controls the output power of the inverter 21, which is measured based on the system current and the system voltage detected by the system current/voltage detector 221, to be maximized. More specifically, the second power controller 224 causes the target value of the DC bus voltage to vary in predetermined step sizes according to the hill climbing method to search for the operating point that maximizes the output power of the inverter 21 and controls the output power of the inverter 21 to be maintained at the maximum power point. The second power controller 224 generates a voltage command value based on a difference between the operating point voltage and the DC bus voltage detected by the second bus voltage detector 222 and outputs the voltage command value to the second driver 225. The second driver 225 generates a drive signal based on the voltage command value and drives the switching devices of the inverter 21 accordingly.

It is preferred that the speed at which the second power controller 224 controls the power of the inverter 21 and the speed at which the first power controller 124 controls the power of the DC-DC converter 11 are set to different response speeds. For example, the power control speed of the DC-DC converter 11 may be set to 100 ms, and the power control speed of the inverter 21 may be set to 1 s. Alternatively, the speed setting may be inverted. By providing a difference between the power control speed of the DC-DC converter 11 and the power control speed of the inverter 21, hunting between converter control and inverter control is prevented.

The first reference voltage and the second reference voltage are set to be higher than the peak value of the system voltage. If the DC bus voltage becomes lower than the peak value of the system voltage, the quality of the output voltage of the inverter 21 drops.

Figure 2A:
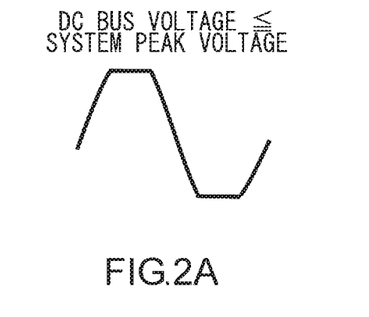
FIGS. 2A and 2B show the relationship between the DC bus voltage and the system peak voltage and the output voltage waveforms of the inverter.
Figure 2B:
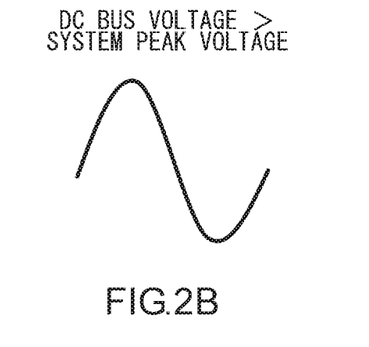

FIGS. 2A and 2B show the relationship between the DC bus voltage and the system peak voltage and the output voltage waveforms of the inverter 21. In the case the system voltage is AC 200V, for example, the peak voltage of the system voltage is about ±283 V. The DC bus voltage equal to lower than 283 V results in a voltage shortage in the output of the inverter 21 and a distorted waveform as shown in FIG. 2A. The DC bus voltage higher than 283 V results in a normal sinusoidal waveform of the output voltage of the inverter 21 as shown in FIG. 2B.

The second reference voltage is set to a value lower than the first reference voltage. For example, the first reference voltage may be set to 330 V, and the second reference voltage may be set to 320 V. The inverter 21 is located in a stage more toward the end than the DC-DC converter 11 and is affected by a voltage drop due to the wiring resistance of the DC bus 30. The longer the distance between the DC-DC converter 11 and the inverter 21, the larger the impact. The first reference voltage and the second reference voltage are set to compensate an error produced by the wiring resistance and a measurement error of the first bus voltage detector 122 and the second bus voltage detector 222. In other words, these errors are identified in advance by an experiment or simulation and the values of the first reference voltage and the second reference voltage are determined based on the identified errors.

Figure 3A:
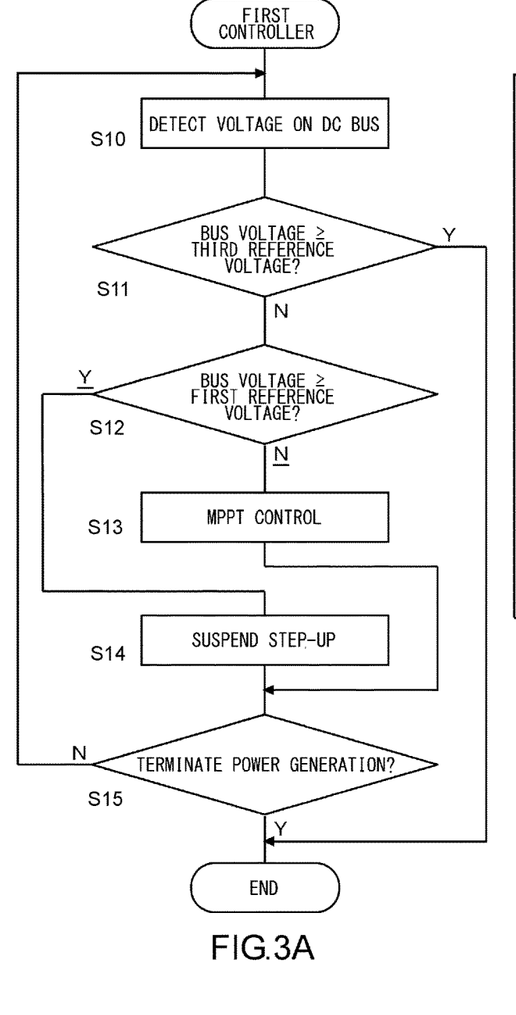
FIGS. 3A and 3B are flowcharts showing the basic operations of the first controller of the first power converter and the second controller of the second power converter according to the embodiment.
Figure 3B:
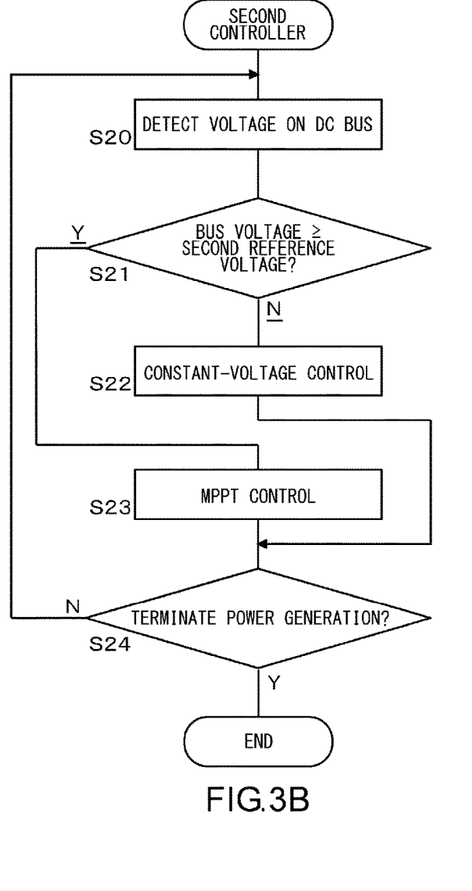

FIGS. 3A and 3B are flowcharts showing the basic operations of the first controller 12 of the first power converter 10 and the second controller 22 of the second power converter 20 according to the embodiment. FIG. 3A shows the basic operation of the first controller 12, and FIG. 3B shows the basic operation of the second controller 22, respectively.

Referring to FIG. 3A, the first controller 12 detects the voltage on the DC bus 30 (S10). The first controller 12 may compare the detected voltage to a third reference voltage higher than the first reference voltage(S11). When the bus voltage is equal to or higher than the third reference voltage (Y in S11), the first controller may force suspension of the operation of the DC-DC converter 11. In this case, the devices in the first power converter 10 and the second power converter 20 are protected from an excessive voltage on the DC bus. When the bus voltage is lower than the third reference voltage (N in S11), operation may continue. The first controller 12 compares the detected bus voltage with the first reference voltage (S12). When the bus voltage is lower than the first reference voltage (N in S12), the first controller 12 subjects the DC-DC converter 11 to MPPT control (S13). When the bus voltage is equal to or higher than the first reference voltage (Y in 12), the first controller 12 stops the step-up operation of the DC-DC converter 11 (S14). The above process is repeated (N in S15) until the solar cell 2 stops generating power (Y in S15).

When the mode is switched in the above control, the first controller 12 smoothly turns the step-up operation on or off. In other words, the first controller 12 progressively lowers the output power of the DC-DC converter 11 when the bus voltage changes from a state of being lower than the first reference voltage to a state of being equal to or higher than the first reference voltage. This prevents the DC-DC converter 11 from stopping and prevents the power from dropping abruptly when the bus voltage rises due, for example, to a disturbance. Further, the first controller 12 progressively raises the output power of the DC-DC converter 11 when the bus voltage changes from a state of being equal to or higher than the first reference voltage to a state of being lower than the first reference voltage.

Referring to FIG. 3B, the second controller 22 detects the voltage on the DC bus 30 (S20). The second controller 22 compares the detected bus voltage with the second reference voltage (S21). When the bus voltage is lower than the second reference voltage (N in S21), the second controller controls the voltage of the inverter 21 to be maintained at a predetermined target value (S22). When the bus voltage is equal to or higher than the second reference voltage (Y in S21), the second controller 22 subjects the inverter 21 to MPPT control (S23). The above process is repeated (N in S24) until the solar cell 2 stops generating power (Y in S24).

In the comparison made in step S12 and step S21, hysteresis may be introduced in the first reference voltage and the second reference voltage. For example, the bus voltage and the first reference voltage may be compared by a hysteresis comparator. Alternatively, the value of the first reference voltage may differ depending on whether the bus voltage turns higher to lower than the first reference voltage and when it turns lower to higher than the first reference voltage. For example, the value for the former case may be set to be lower than the value for the latter case. The same holds true of the relationship between the bus voltage and the second reference voltage. By introducing hysteresis in this way, the operation mode is prevented from being switched frequently when the bus voltage stays in the neighborhood of the first reference voltage and the second reference voltage.

Figure 4A:
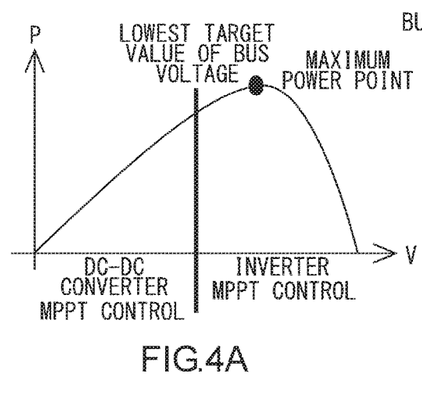
FIGS. 4A and 4B are graphs showing the operation performed when the bus voltage is equal to or higher than the first reference voltage and the second reference voltage.
Figure 4B:
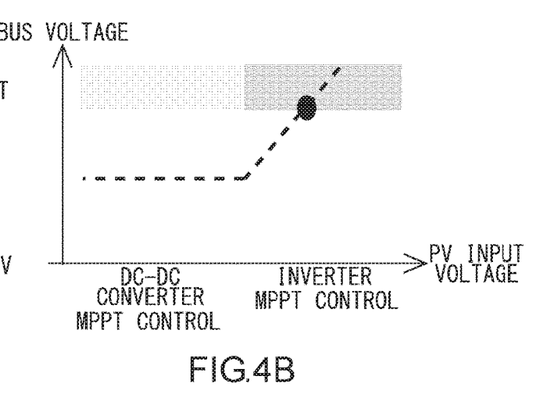

FIGS. 4A and 4b are graphs showing the operation performed when the bus voltage is equal to or higher than the first reference voltage and the second reference voltage. FIG. 4A shows the P-V characteristics of the solar cell 2. FIG. 4B shows the relationship between the input voltage of the solar cell 2 and the voltage on the DC bus 30. The step-up operation of the DC-DC converter is suspended, and the input voltage of the solar cell 2 input to the DC-DC converter 11 substantially identical to the voltage on the DC bus 30. To be strict, the voltage on the DC bus 30 is lower due to the loss induced by the devices like the reactor, diode, etc.

The inverter 21 changes the voltage of the DC bus 30 to maximize the output power of the inverter 21. The second controller 22 can cause the variation in the output power of the inverter 21 to substantially match the variation in the input voltage of the solar cell 2 by increasing or decreasing the target value of the bus voltage. To be strict, an error is produced due to the conversion loss, but the changes in the power substantially match each other. Accordingly, MPPT control with reference to the output power of the inverter 21 is possible.

Figure 5:
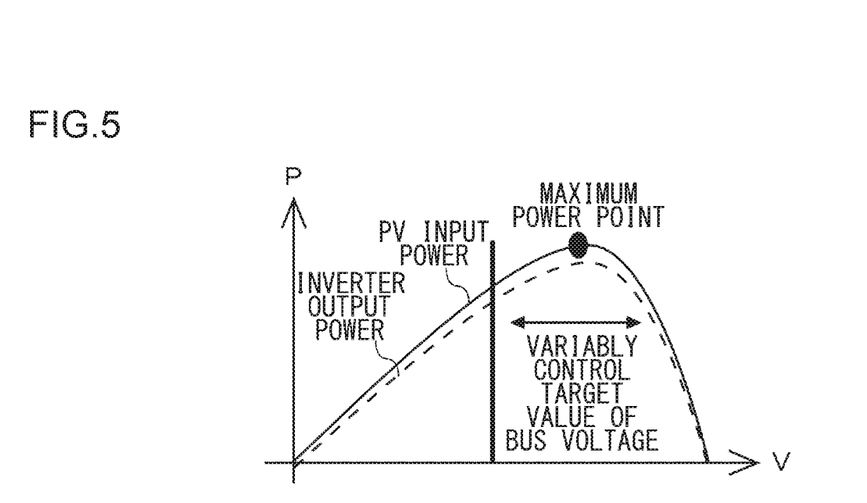
FIG. 5 is a graph showing the relationship between the input voltage of the solar cell and the output power of the inverter occurring when the voltage on the DC bus is equal to or higher than the first reference voltage and the second reference voltage.

FIG. 5 is a graph showing the relationship between the input voltage of the solar cell 2 and the output power of the inverter 21 occurring when the voltage on the DC bus 30 is equal to or higher than the first reference voltage and the second reference voltage. When the bus voltage is equal to or higher than the first reference voltage and the second reference voltage as in this case, the second controller 22 causes the solar cell 2 to generate power at the maximum power point by executing MPPT control with reference to the output power of the inverter 21.

Figure 6A:
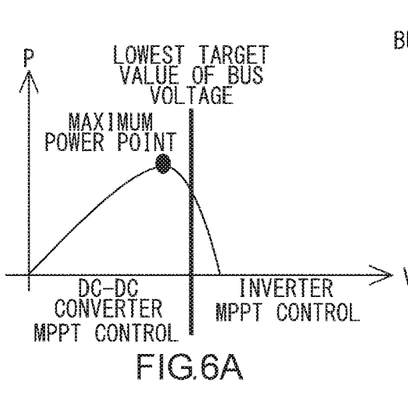
FIGS. 6A and 6B are graphs showing the operation performed when the voltage on the DC bus is lower than the first reference voltage and the second reference voltage.
Figure 6B:
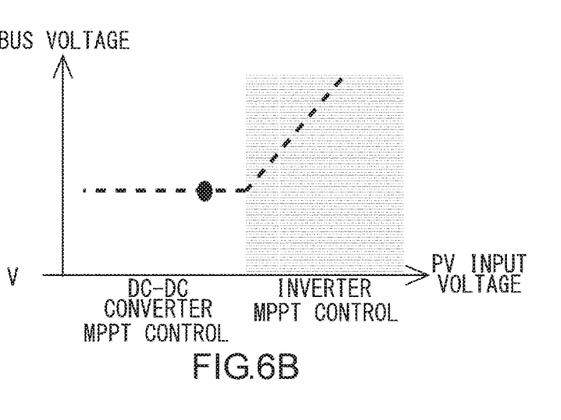

FIGS. 6A and 6B are graphs showing the operation performed when the voltage on the DC bus 30 is lower than the first reference voltage and the second reference voltage. FIG. 6A shows the P-V characteristics of the solar cell 2. FIG. 6B shows the relationship between the input voltage of the solar cell 2 and the voltage on the DC bus 30. The DC-DC converter 11 executes MPPT control and causes the input voltage of the solar cell 2 to vary to maximize the power generated by the solar cell 2. The inverter 21 controls the voltage on the DC bus 30 to be maintained at a constant voltage (e.g., 330 V).

As described above, the embodiment allows the inverter 21, instead of the DC-DC converter 11, to execute MPPT control when the optimal operating point of the solar cell 2 is higher than the bus voltage. This causes the solar cell 2 to generate power at the optimal operating point even when the optimal operating point of the solar cell 2 is higher than the bus voltage.

By comparing the reference value of the bus voltage with the detected value of the bus voltage, the bus voltage is controlled to the optimal bus voltage that minimizes the conversion loss in the inverter 21. If the reference value of the bus voltage is compared with the input voltage value of the solar cell 2, on the other hand, the voltage is not detected on the DC bus but at the input of the DC-DC converter 11 so that an error due to the loss in the devices forming the DC-DC converter 11 is produced. In this embodiment, the detected value of the bus voltage is used so that the error is not produced.

The operation mode of the DC-DC converter 11 and the inverter 21 is determined with reference to the bus voltage with which both the DC-DC converter 11 and the inverter 21 can be monitored. Accordingly, it is not necessary to communicate information related to the input voltage of the solar cell 2 between the DC-DC converter 11 and the inverter 21 even when they are controlled separately.

Described above is an explanation based on an exemplary embodiment. The embodiment is intended to be illustrative only and it will be obvious to those skilled in the art that various modifications to constituting elements and processes could be developed and that such modifications are also within the scope of the present invention.

FIG. 1 shows the power conversion system 1 of a separated type, but the control according to the embodiment is equally applicable to the power conversion system 1 in which the DC-DC converter 11 and the inverter 21 are installed in one housing and the DC-DC converter 11 and the inverter 21 are controlled by different IC's.

In the above embodiment, a description is given of a case where the first reference value and the second reference value are set to different values, but that does not exclude setting them to the same value. Further, a third reference voltage higher than the first reference voltage may be set in the first operation determination unit 123, and the first operation determination unit 123 may direct the first power controller 124 to force suspension of the operation of the DC-DC converter 11 when the bus voltage is equal to or higher than the third reference voltage. In this case, the devices in the first power converter 10 and the second power converter 20 are protected from an excessive voltage on the DC bus.

The first reference voltage and the second reference voltage may be set to be equal to or higher than the peak value of the system voltage and higher than the maximum power point voltage (e.g., 400 V) of the solar cell 2, and the second controller 22 may maintain the voltage on the DC bus 30 to be lower than the first reference voltage and the second reference voltage and higher than the peak value of the system voltage and the maximum power point voltage of the solar cell. In this case, the conversion loss in the inverter 21 will be increased as compared with the example shown in the embodiment, but the power control of the inverter 21 is simplified because the MPPT control mode is not executed in the inverter 21. By setting the first reference voltage and the second reference voltage to be high, the user can select such an operation mode.

Figure 7:
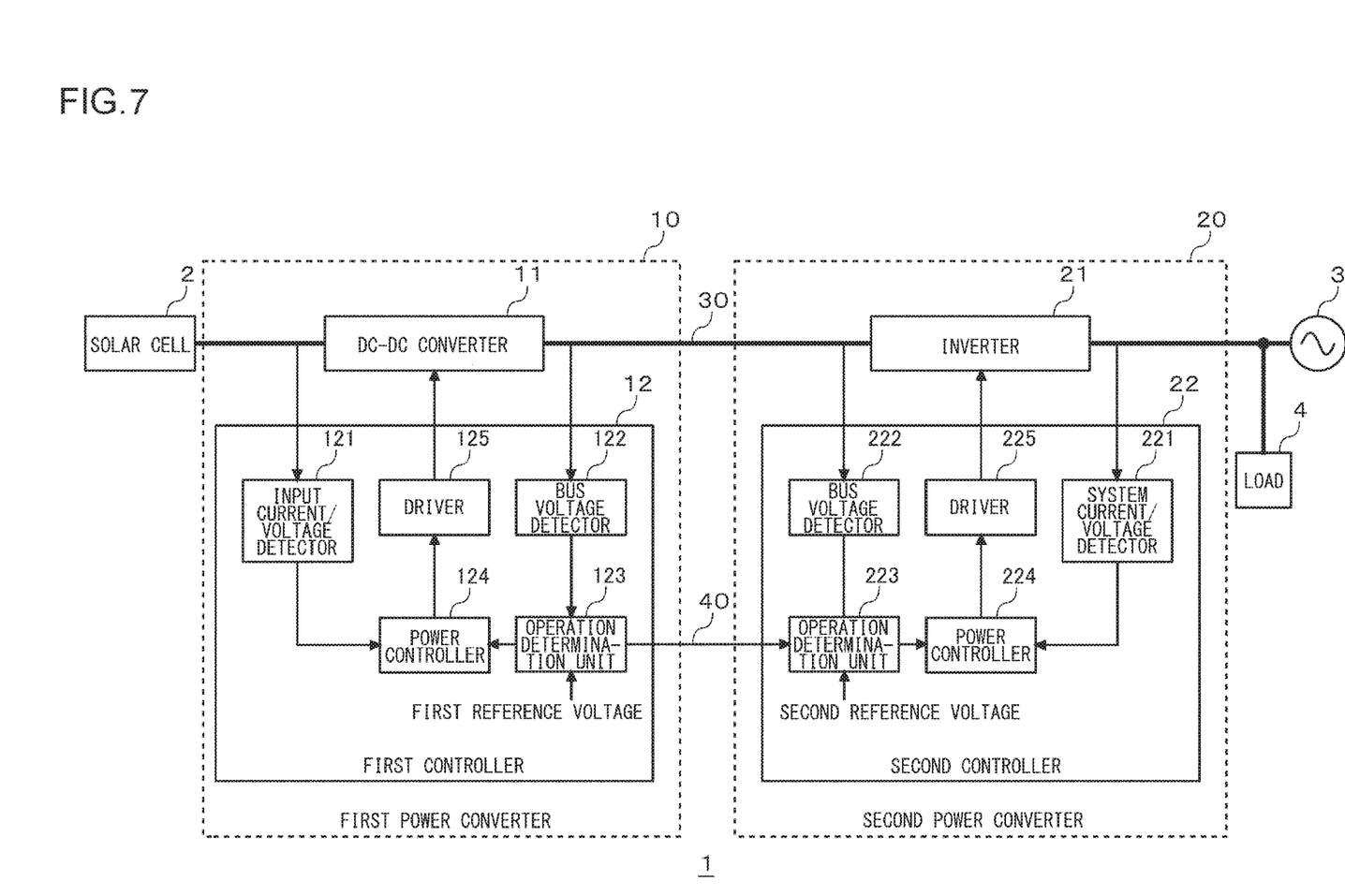
FIG. 7 shows the power conversion system according to a variation of the disclosure.

In the above embodiment, a description is given of a case where communication is not performed between the first controller 12 and the second controller 22, but the controllers may be connected by a connection line. FIG. 7 shows the power conversion system 1 according to a variation of the disclosure. In the power conversion system 1 according to the variation, the first controller 12 and the second controller 22 are connected by a communication line 40. The first operation determination unit 123 of the first controller 12 communicates the result of comparing the bus voltage with the first reference voltage to the second operation determination unit 223 of the second controller 22 via the communication line 40. The second operation determination unit 223 directs the second power controller 224 to operate the inverter 21 in the constant-voltage control mode or in the MPPT control mode based on the result of comparison. Communication data carried on the communication line 40 is defined by a simple binary signal brought to a high level "1" in the constant-voltage control mode and a low level "0" in the MPPT control mode.

Conversely, the second operation determination unit 223 of the second controller 22 may communicate the result of comparing the bus voltage with the second reference value to the first operation determination unit 123 of the first controller 12 via the communication line 40. In this case, the first operation determination unit 123 directs the first power controller 124 to operate the DC-DC converter 11 in the MPPT control mode or in the step-up suspension mode based on the result of comparison. According to this variation, the operation mode of the DC-DC converter 11 and the operation mode of the inverter 21 are synchronized more successfully so that hunting therebetween is prevented.

When it is necessary to restrict the power output from the solar cell 2 to the system 3 (e.g., when an output restriction command is received from an institution responsible for the operation of the system), the second controller 22 may control the inverter 21 such that the voltage on the DC bus 30 is equal to or higher than the first reference voltage. According to this approach, it is possible to restrict the output of the solar cell 2 without communicating from the side of the inverter 21 to the side of the DC-DC converter 11.

The embodiments may be defined by the following items.

[Item 1]

A power conversion system (1) comprising:

a DC-DC converter (11) that converts a DC power supplied from a solar cell (2) into a DC power of a different voltage and outputs the DC power to a DC bus (30);

an inverter (21) that converts the DC power input from the DC bus (30) into an AC power and outputs the AC power to a system (3);

a first controller (12) that controls the DC-DC converter (11) to perform a step-up operation when a voltage on the DC bus (30) is lower than a first reference voltage and controls the DC-DC converter (11) to suspend the step-up operation when the voltage is equal to or higher than the first reference voltage; and a second controller (22) that controls the inverter (21) to maintain the voltage on the DC bus (30) constant when the voltage on the DC bus (30) is lower than a second reference voltage and controls the inverter (21) to maximize an output power of the inverter (21) when the voltage is equal to or higher than the second reference voltage.

According to the embodiment, it is possible to reduce the conversion loss in the inverter (21), while also maximizing the electricity generated by the solar cell (2).

[Item 2]

The power conversion system (1) according to item 1, wherein the first reference voltage and the second reference voltage are set to be higher than a peak value of a system voltage.

According to the embodiment, the waveform of the output voltage is prevented from being distorted due to a shortage in the output voltage of the inverter (21).

[Item 3]

The power conversion system (1) according to item 1, wherein the first reference voltage is set to be lower than the second reference voltage.

According to the embodiment, bus voltage measurement error of the detector between both produced by the wiring resistance, etc. of the DC bus (30) are compensated.

[Item 4]

The power conversion system (1) according to item 3, wherein a difference is provided between a speed of power control of the DC-DC converter (11) by the first controller (12) and a speed of power control of the inverter (21) by the second controller (22).

According to the embodiment, hunting between the former power control and the latter power control is prevented.

[Item 5]

The power conversion system (1) according to any one of items 1 through 4, further comprising:

a communication line (40) provided for control between the first controller (12) and the second controller (22), wherein one of:

the process of communicating a result of comparing the voltage on the DC bus (30) with the first reference voltage from the first controller (12) to the second controller (22) via the communication line (40); and the process of communicating a result of comparing the voltage on the DC bus (30) with the second reference voltage from the second controller (22) to the first controller (12) via the communication line (40) is executed.

According to the embodiment, the operation mode of the DC-DC converter (11) and the operation mode of the inverter (21) are synchronized more successfully so that hunting therebetween is prevented.

[Item 6]

The power conversion system (1) according to any one of items 1 through 5, wherein hysteresis is introduced in the first reference voltage and the second reference voltage.

According to the embodiment, the operation mode is prevented from being switched frequently and the operation is stabilized.

[Item 7]

The power conversion system (1) according to any one of items 1 through 6, wherein the first reference voltage and the second reference voltage are set to be higher than a peak value of a system voltage and a maximum power point voltage of the solar cell (2), and the second controller (22) controls the voltage on the DC bus (30) to be maintained at a voltage lower than the first reference voltage and the second reference voltage and higher than the peak value of the system voltage and the maximum power point voltage of the solar cell (2).

According to the embodiment, it is not necessary to subject the inverter (21) to MPPT control so that the control of the inverter (21) is simplified.

[Item 8]

The power conversion system (1) according to any one of items 1 through 7, wherein the first controller (12) progressively lowers an output power of the DC-DC converter (11) when the voltage on the DC bus (30) becomes equal to or higher than the first reference voltage and progressively raises the output power of the DC-DC converter (11) when the voltage on the DC bus (30) becomes lower than the first reference voltage.

According to the embodiment, the output power of the DC-DC converter (11) is prevented from varying abruptly.

[Item 9]

The power conversion system (1) according to any one of items 1 through 8, wherein the first power controller (12) forces suspension of an operation of the DC-DC converter (11) when the voltage on the DC bus (30) is equal to or higher than a third reference voltage higher than the first reference voltage.

According to the embodiment, circuit devices can be protected from an excessive voltage on the DC bus (30).

[Item 10]

The power conversion system (1) according to any one of items 1 through 9, wherein, when an output power of the solar cell (2) is restricted, the second controller (22) controls the inverter (21) such that the voltage on the DC bus (30) is equal to or higher than the first reference voltage.

According to the embodiment, the output power of the solar cell (2) is inhibited without requiring communication from the side of the inverter (21) to the side of the DC-DC converter (11).

[Item 11]

A power converter (10) comprising:

a DC-DC converter (11) that converts a DC power supplied from a solar cell (2) into a DC power of a different voltage and outputs the DC power to a DC bus (30); and a first controller (12) that controls the DC-DC converter (11) to perform a step-up operation when a voltage on the DC bus (30) is lower than a first reference voltage and controls the DC-DC converter (11) to suspend the step-up operation when the voltage is equal to or higher than the first reference voltage, the power converter (10) being connected to a further power converter (20) including:

an inverter (21) that converts the DC power input from the DC bus (30) into an AC power and outputs the AC power to a system (3);

a second controller (22) that controls the inverter (21) to maintain the voltage on the DC bus (30) constant when the voltage on the DC bus (30) is lower than a second reference voltage and controls the inverter (21) to maximize an output power of the inverter (21) when the voltage is equal to or higher than the second reference voltage.

According to the embodiment, it is possible to reduce the conversion loss in the inverter (21), while also maximizing the electricity generated by the solar cell (2).

[Item 12]

A power converter (20) connected to a further power converter (10) including:

a DC-DC converter (11) that converts a DC power supplied from a solar cell (2) into a DC power of a different voltage and outputs the DC power to a DC bus (30); and a first controller (12) that controls the DC-DC converter (11) to perform a step-up operation when a voltage on the DC bus (30) is lower than a first reference voltage and controls the DC-DC converter (11) to suspend the step-up operation when the voltage is equal to or higher than the first reference voltage, the power converter (20) comprising:

an inverter (21) that converts the DC power input from the DC bus (30) into an AC power and outputs the AC power to a system (3); and a second controller (22) that controls the inverter (21) to maintain the voltage on the DC bus (30) constant when the voltage on the DC bus (30) is lower than a second reference voltage and controls the inverter (21) to maximize an output power of the inverter (21) when the voltage is equal to or higher than the second reference voltage.

According to the embodiment, it is possible to reduce the conversion loss in the inverter (21), while also maximizing the electricity generated by the solar cell (2).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A power conversion system comprising:
   a DC-DC converter that converts a first DC power supplied from a solar cell into a second DC power of a different voltage and outputs the second DC power to a DC bus;
   an inverter that converts the second DC power from the DC bus into an AC power and outputs the AC power to a system; a first controller that subjects the DC-DC converter to-maximum power point tracking (MDPT) control when a voltage on the DC bus is lower than a first reference voltage to maximize an input power of the solar cell and controls the DC-DC converter to suspend a step-up operation when the voltage is equal to or higher than the first reference voltage;
   a second controller that controls the inverter to maintain the voltage on the DC bus at a target value higher than a system voltage when the voltage on the DC bus is lower than a second reference voltage, by referring to a voltage command value generated based on a difference between the target value of the voltage on the DC bus and the voltage on the DC bus as detected, and subjects the inverter to IVMFT control to maximize an output power of the inverter when the voltage is equal to or higher than the second reference voltage, wherein the second reference voltage is set to be lower than the first reference voltage, wherein a difference is provided between a speed of power control of the DC-DC converter by the first controller and a speed of power control of the inverter by the second controller.

2. The power conversion system according to claim 1, wherein the first reference voltage and the second reference voltage are set to be higher than a peak value of a system voltage.

3. The power conversion system according to claim 1, further comprising: a communication line provided for control between the first controller and the second controller, wherein one of: a process of communicating a result of comparing the voltage on the DC bus with the first reference voltage from the first controller to the second controller via the communication line; and the process of communicating a result of comparing the voltage on the DC bus with the second reference voltage from the second controller to the first controller via the communication line is executed.

4. The power conversion system according to claim 1, wherein
   hysteresis is introduced in the first reference voltage and the second reference voltage.

5. The power conversion system according to claim 1, wherein
   the first reference voltage and the second reference voltage are set to be higher than a peak value of a system voltage and the maximum power point voltage of the solar cell, and
   the second controller controls the voltage on the DC bus to be maintained at a voltage lower than the first reference voltage and the second reference voltage and higher than the peak value of the system voltage and the maximum power point voltage of the solar cell.

6. The power conversion system according to claim 1, wherein
   the first controller progressively lowers an output power of the DC-DC converter when the voltage on the DC bus becomes equal to or higher than the first reference voltage and progressively raises the output power of the DC-DC converter when the voltage on the DC bus becomes lower than the first reference voltage.

7. The power conversion system according to claim 1, wherein
the first power controller forces suspension of an operation of the DC-DC converter when the voltage on the DC bus is equal to or higher than a third reference voltage higher than the first reference voltage.

8. The power conversion system according to claim 1, wherein
when an output power of the solar cell is restricted, the second controller controls the inverter such that the voltage on the DC bus is equal to or higher than the first reference voltage.

9. A power converter comprising:
a DC-DC converter that converts a first DC power supplied from a solar cell into a second DC power of a different voltage and outputs the second DC power to a DC bus;
and a first controller that subjects the DC-DC converter to maximum power point tracking (MPPT) control when a voltage on the DC bus is lower than a first reference voltage to maximize an input power of the solar cell and controls the DC-DC converter to suspend a step-up operation when the voltage is equal to or higher than the first reference voltage,
the DC-DC converter being connected to a further power system including:
an inverter that converts the second DC power from the DC bus into an AC power and outputs the AC power to a system;
a second controller that controls the inverter to maintain the voltage on the DC bus at a target value higher than a system voltage when the voltage on the DC bus is lower than a second reference voltage, by referring to a voltage command value generated based on a difference between the target value of the voltage on the DC bus and the voltage on the DC bus as detected, and subjects the inverter to MPPT control to maximize an output power of the inverter when the voltage is equal to or higher than the second reference voltage, wherein the second reference voltage is set to be lower than the first reference voltage, wherein a difference is provided between a speed of power control of the DC-DC converter by the first controller and a speed of power control of the inverter by the second controller.

10. A power converter including:
a DC-DC converter that converts a first DC power supplied from a solar cell into a second DC power of a different voltage and outputs the second DC power to a DC bus;
and a first controller that subjects the DC-DC converter to maximum power point tracking (MPPT) control when a voltage on the DC bus is lower than a first reference voltage to maximize an input power of the solar cell and controls the DC-DC converter to suspend a step-up operation when the voltage is equal to or higher than the first reference voltage,
the power converter further comprising:
an inverter that converts the second DC power from the DC bus into an AC power and outputs the AC power to a system;
a second controller that controls the inverter to maintain the voltage on the DC bus at a target value higher than a system voltage when the voltage on the DC bus is lower than a second reference voltage, by referring to a voltage command value generated based on a difference between the target value of the voltage on the DC bus and the voltage on the DC bus as detected, and subjects the inverter to MFPT control to maximize an output power of the inverter when the voltage is equal to or higher than the second reference voltage, wherein the second reference voltage is set to be lower than the first reference voltage, wherein a difference is provided between a speed of power control of the DC-DC converter by the first controller and a speed of power control of the inverter by the second controller.

* * * * *